A. Lane,
Turning Irregular Forms.
N°7,956.                        Patented Feb.25, 1851.
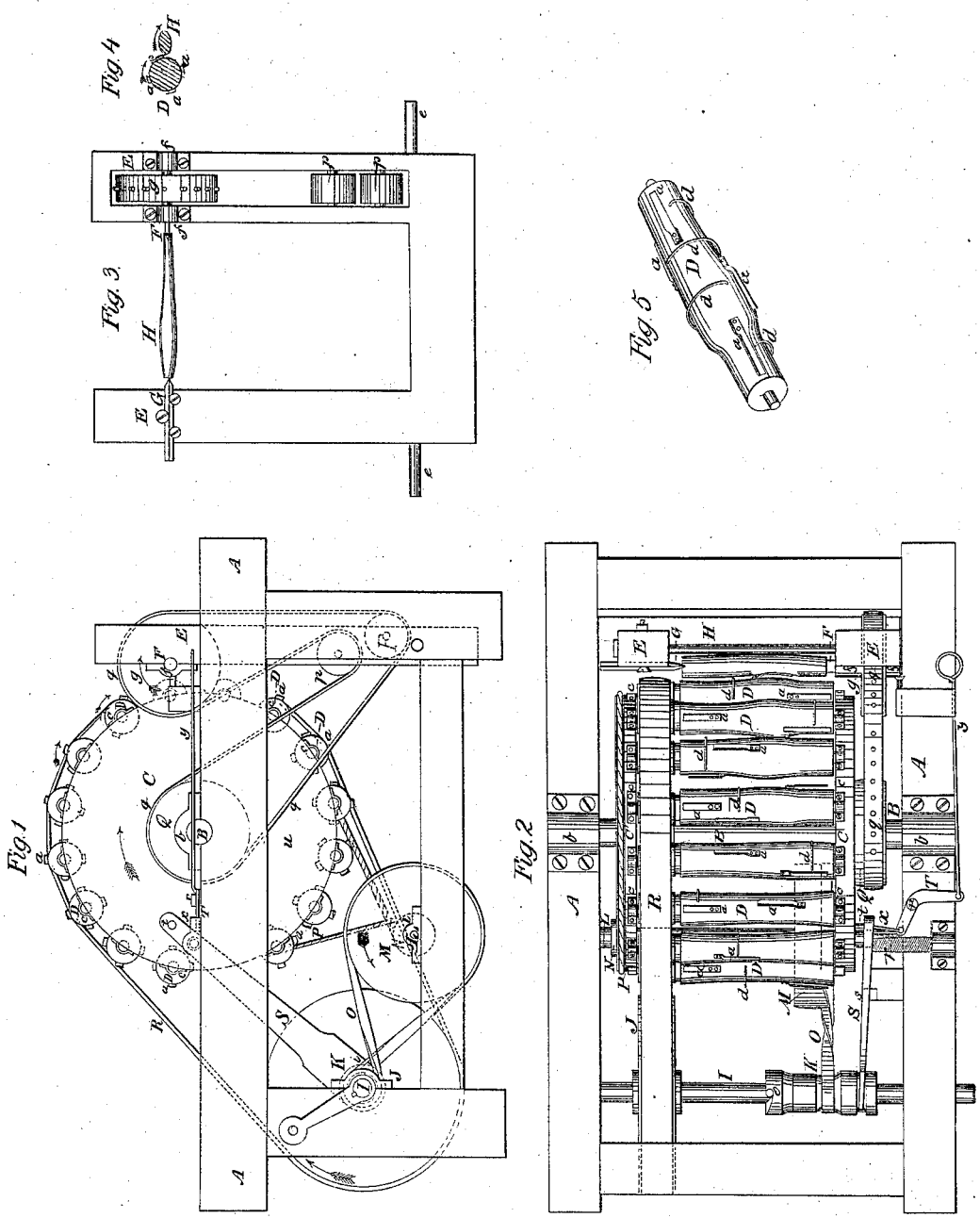

UNITED STATES PATENT OFFICE.

ABNER LANE, OF KILLINGSWORTH, CONNECTICUT.

MACHINERY FOR TURNING IRREGULAR FORMS.

Specification of Letters Patent No. 7,956, dated February 25, 1851.

*To all whom it may concern:*

Be it known that I, ABNER LANE, of Killingsworth, in the county of Middlesex and State of Connecticut, have invented certain new and useful Improvements in Machinery for Cutting Irregular Forms in Wood or other Substances; and I do hereby declare that the following is a full, clear, and exact description of the construction and operation thereof, reference being had to the accompanying drawings, forming part of this specification, in which—

Figure 1 is a side elevation. Fig. 2 is a plan or top view. Fig. 3 is an elevation of the frame and centers for holding the material to be cut looking from the cutters. Fig. 4 is a transverse section of the material and one of the cutter shafts detached from the machine. Fig. 5 is a perspective view of one of the cutter shafts.

Similar letters of reference indicate corresponding parts in each of the several figures.

The nature of my invention consists in cutting any irregular form by means of any required number of cutters mounted on one or more rotary shafts or cylinders, each and all of the said cutters being formed so as to give the required form to the article to be cut or formed.

To enable others skilled in the art to make and use my invention I will proceed to describe fully its construction and operation.

A, A, represent the frame of the machine, of suitable material, form and strength to carry the working parts.

B, is a shaft, hung in bearings $b$, $b$, on the frame, and carrying two circular heads or wheels C, C′, which may be of wood or metal, firmly secured at the required distance apart.

D, D, D, D, are cutter shafts or cylinders which may be of wood or metal, their axes are mounted in bearings $c$, $c$, $c$, $c$, on the peripheries of the wheels or heads C, C′; they are each provided with a series of knives or cutters $a$, $a$, $a$, $a$, arranged on different parts of their peripheries, in such a manner that all the edges of the knives on any cylinder or shaft will form a line, that line being the reverse of one edge of the profile of a longitudinal section, taken in one particular direction through the article cut when finished; and all the cylinders or shafts having their knives or cutters set to form the reverses of the different profiles of the article, which would come in contact with them during the revolution of the article and the shaft B, at the same speed; they are each provided with one or more projections or ribs $d$, $d$, $d$, $d$, extending nearly all around them, and forming guards for the rough material to bear against, being set slightly within the circle described by the edges of the cutters, so as to gage the thickness of the chip cut, and prevent a jarring or tremulous motion of the material.

E, E, represent a frame hung on pivots or axis $e$, $e$, which have bearings in the sides of the frame A, A; it is movable at its upper end. F, is a live spindle hung in bearings $f$, $f$, attached to one side of the frame E, E, and having a spur or chisel point; it is provided with a pulley $g$.

G, is a dead spindle secured to the opposite side of the frame to F, and having a conical point.

H, represents the article being cut which in this instance it a hatchet handle, the cutter shafts and the cutters being formed and set accordingly; it is placed between the points of the spindles F, and G.

I, is the main driving shaft which is mounted in bearings $i$, on the frame A, A, and carries a large pulley J, and a small pulley K.

L, is an intermediate shaft mounted in bearings $l$, on the frame A, A, and carrying the large pulley M, and small pulley N.

O, is a crossed endless band running on the pulleys K, and M, communicating motion from the driving shaft to the intermediate shaft L, and P, is another crossed endless band running on the pulley N, and the wheels C′, communicating motion from the intermediate shaft L, to the shaft B, and causing the wheels C, C′, carrying the cutter shafts to rotate, at a slow speed; the directions in which the shafts rotate are pointed out by arrows in Fig. 1.

Q, is a pulley secured on the shaft B, it is of the same diameter as the pulley $g$, on the spindle F.

$q$, is an endless band passing over the pulleys Q, and $g$, being guided by the guide pulleys $p$, $p$, on the frame E, E. It gives motion to the spindle F, and to the article to be cut, in the same direction and at the same speed as the shaft B, the uniformity of speed being preserved by short pins or studs on the peripheries of the pulleys, which take into holes on the band; the band is passed over the guide pulleys $p$, $p$, at the lower part of the frame for the purpose of allowing the spindles F, and G, to be thrown back, to take out or put in the work without tightening or slackening the band.

R, is an endless band passing from the pulley J, over the cutter shafts and giving those on which it bears a rapid rotary motion in the direction shown by the arrows in Figs. 1 and 4; the pressure of the band upon the cutter shaft which is doing the work, may be increased by the application of friction pulleys, which may be caused by springs or weights to bear upon the outside of the band between the shafts nearer the work.

The pulley K, on the driving shaft, which gives motion to the wheels C, C', is fitted loosely on the shaft and only rotates with the shaft while a notch on one end of it, is brought in gear with a pin or stud $o$, on the shaft by a forked lever S, mounted on a fixed center or pivot $s$, secured in an arm attached to the frame, the fork on the lever embracing a groove in the boss of the pulley; a helical spring $r$, attached to the frame, is always bearing on the upper end of the lever and has a tendency to remove the pulley from the stud $o$, but is prevented by a stud or pin $t$, on the opposite side of the lever, which bears upon the side of the wheel and keeps the pulley to the stud, causing it to rotate with the shaft until the wheels C, C', have performed a revolution, when the stud $t$, drops into an aperture $u$, in the side of the wheel C, and the lever S, releasing the pulley K, from the stud $o$.

T, is a lever working on a pivot $v$. It is attached by a rod $x$, to the lever S, and has another rod $y$, attached at its opposite end at the command of the attendant. This is for removing the stud $t$, from the aperture $u$, and throwing the pulley K, in gear.

The operation of the machine is as follows: Rotary motion being given to the driving shaft, will through the pulley J, and band R, be transmitted to the cutter shafts or cylinders at a high speed. The rough material being properly adjusted between the spindle F, and G, the operator by pulling the rod $y$, will release the stud $t$, from the aperture $u$, in the wheel C, and throw the pulley K, in gear; this through the driving bands before described will give a slow rotary motion to the wheels C, C', and to the spindle F, which being secured at any convenient distance from the axes of the cutter shafts is the fixed axis of the material. The wheels C, C', and the rough material rotating simultaneously, each of the cutter shafts is brought successively in contact with the material, and as it rotates on its own axis, will cut the material from end to end, leaving a profile the reverse of the form of the edges of the knives or cutters, each cutter shaft forming a side, thus forming a material into a figure having a number of sides equal to the number of cutter shafts employed. When the wheels C, C', have completed a revolution, the aperture $u$, will reach the stud $t$, which will fall into it, the lever S, releasing the pulley K, from the stud $o$, will throw it out of gear, the band R, still continuing the motion of those cutter shafts upon which it bears on their own axes; the article may then be taken out and will easily be finished off by other tools or machinery. The requisite number of cutter shafts will depend on the form or description of the work to be done; fourteen or sixteen will cut an ax or hatchet handle sufficiently into shape; but for a shoe last thirty or forty would be required; the greater the number of cutter shafts employed the smoother the work will be cut and the less finishing it will require.

Having explained the construction and operation of the machine represented in the drawings I will further explain other modifications in the application of my invention.

Instead of forming one article at a time as above described, several may be formed at the same time by suspending them in the same manner at different points around the large revolving wheels.

To facilitate and expedite the work, the large wheels instead of rotating as described with uniform velocity, may by eccentric wheels be caused to move faster during the time when no cutter is operating upon the material. Instead of cutting the material to the required form at one revolution as described, it may be placed farther from the cutters, and a lighter cut taken, the material being gradually moved toward the cutters, and the large wheels and the material being allowed to perform several revolutions before the article is formed of the required size. In shaping articles having nearly flat sides, as ax handles &c. the cutter shafts which are to cut the more flat sides, may be placed closer together than those which are to cut the rounder parts, by which the sides left by the cuts of the different shafts may be made of uniform width.

The cutter shafts instead of being hung on two wheels or caused to revolve around a common axis as described, may be hung on a frame horizontally or otherwise and the material receiving the rotary motion may be moved over each one successively in any convenient manner. If the opposite profiles of the longitudinal sections taken in various directions through the article, are all similar in form as in a hammer handle, one cutter shaft only may be employed to cut the whole surface; the axis of the cutter shaft may be stationary, and the material hung on a frame precisely similar to E, E, above described; to produce the transverse irregular shape, a cam may be attached to each side of the frame, at each end of the article to be formed, the said cams being of the form required for the transverse sections of the respective ends of the article. The cams being made to bear against firm supports on the frame and to rotate simultaneously with the material, will cause the axis of each end of the material to recede from or approach the cutters, in such a manner as to give it the required shape: the material must have a continuous rotary motion, and the movable frame must be so hung as to receive a lateral vibratory motion, when the ends of the article to be formed differ in shape. When both ends are alike, one cam would give the shape to the whole length; the projections or ribs $d$, $d$, on the cutter shafts gaging the thickness of the cut and preventing the cutters taking too deep hold at one time: the material and the cutter shaft may receive several revolutions before the article is cut to the required size, in this way the article will be cut with an even surface, instead of being left with a number of sides as described where the profiles of the various longitudinal sections were unlike.

If the opposite profiles of the longitudinal sections are all equal for a great part of the length of the article, as for instance a spoke for a wagon wheel; one cutter shaft may be used to cut entirely around a part of the length and the remainder of the length may be cut by other cutter shafts. Instead of causing the work to receive a vibratory motion by cams as above described, the axis of the work may be stationary, and the vibratory motion given in the same manner to the cutter shaft or shafts. The whole of any common irregular form may be cut by one cutter wheel, the axis of both the cutter wheel and material being fixed; the material and cutter wheel being geared together so as to rotate at the same speed; in that case the cutter wheel must be very large in proportion to the article to be formed, and a large number of cutters extending the whole length of the wheel either directly or spirally; or several series of shorter cutters forming a continuous edge when in motion must be used; the greater the number of the cutters employed the smoother will be the surface of the article formed, until we have an entire cutting surface similar to a grindstone.

I do not claim merely the employment of two or more cutter wheels or cutter shafts or cylinders, provided with any number of cutters of any required form for cutting the whole surface of, and form articles of any irregular form, without the use of the model of the article to be formed; but

I claim this only—

When the cutting cylinders are sustained, revolved, and carried to and from the block to be turned, by a revolving cylinder in whose periphery they are placed, without any longitudinal motion, while the block revolves slowly without any longitudinal or lateral motion substantially as described.

ABNER LANE.

Witnesses:
HOMER KELSEY,
ELIAS S. ISBELL.